G. B. REISBACH.
ELECTRIC SWITCH.
APPLICATION FILED DEC. 26, 1908.
1,033,935.
Patented July 30, 1912.
6 SHEETS—SHEET 1.
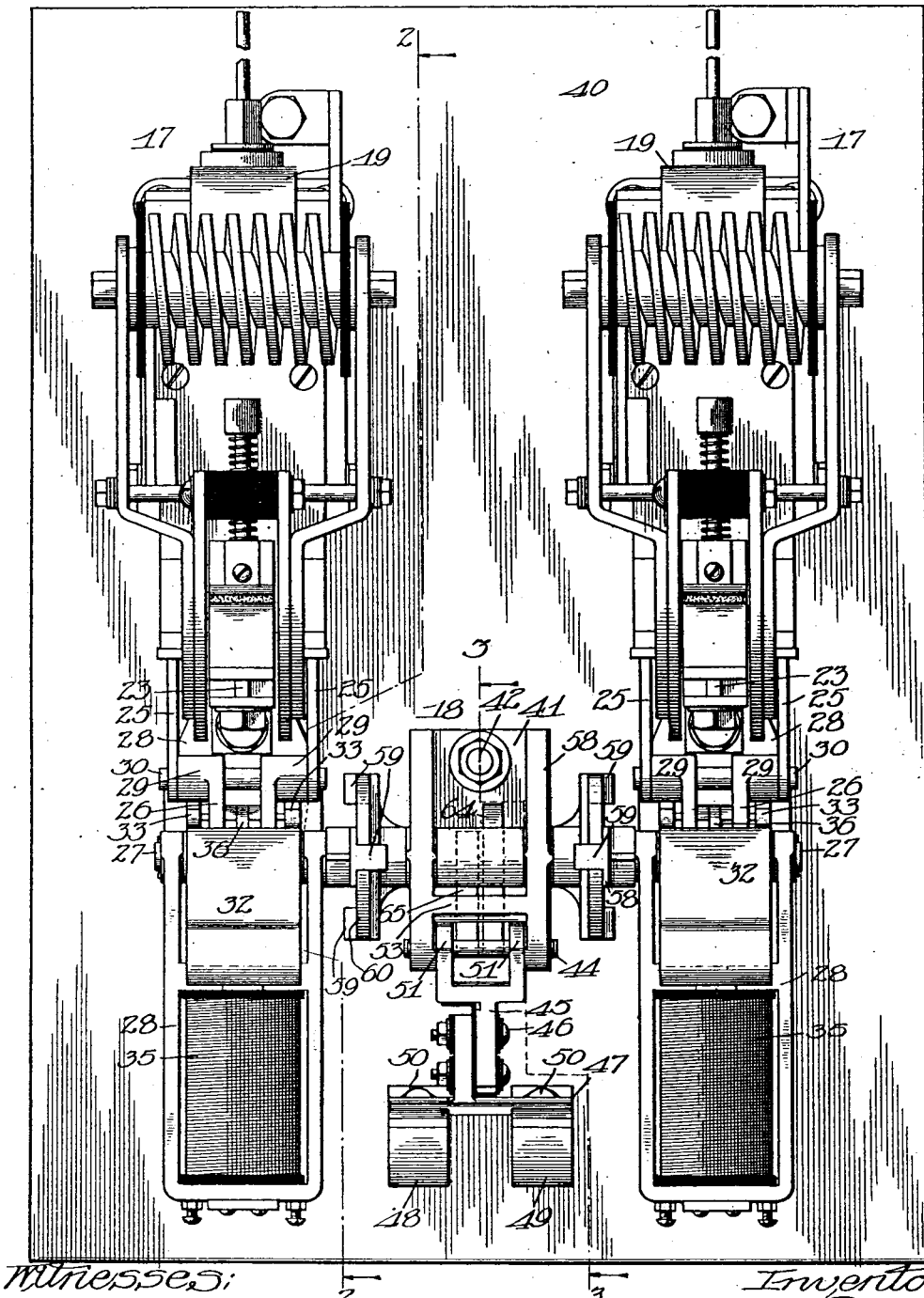

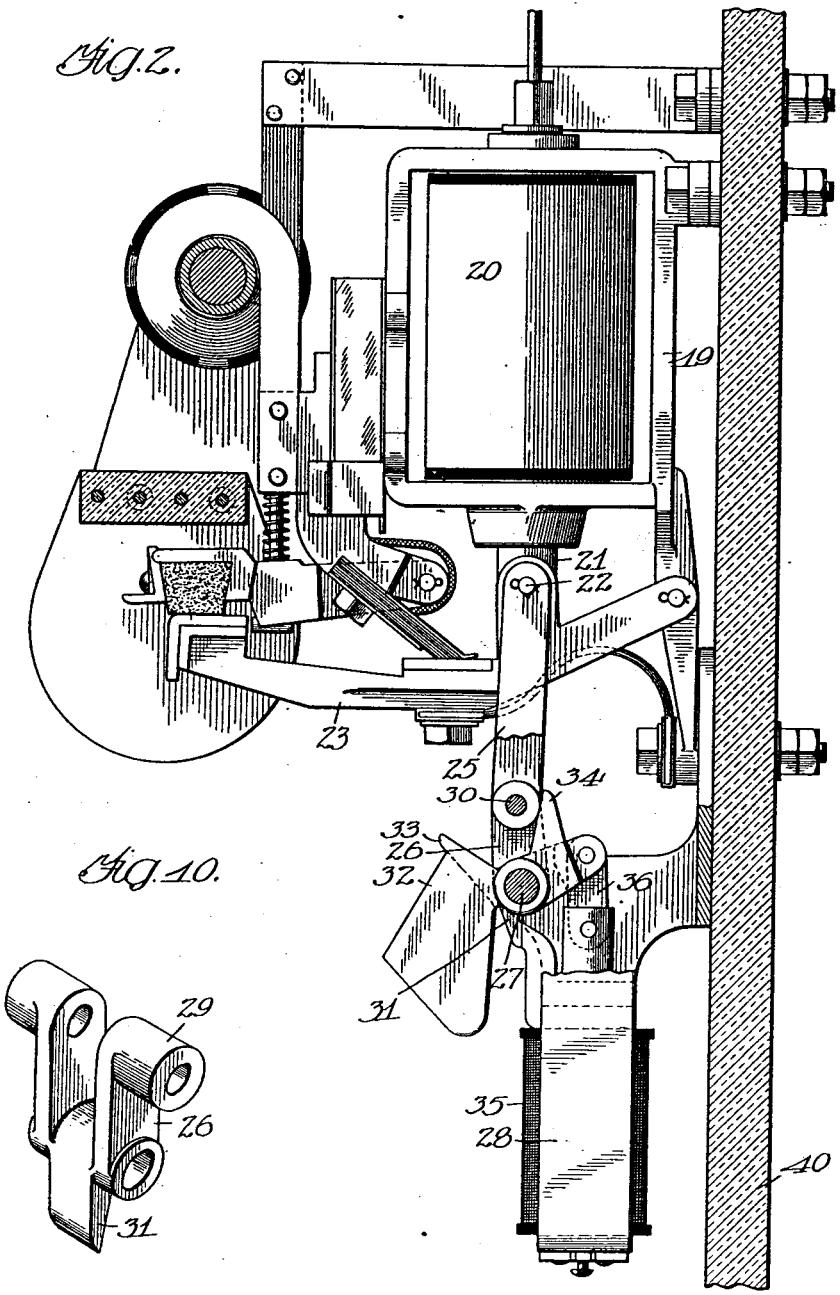

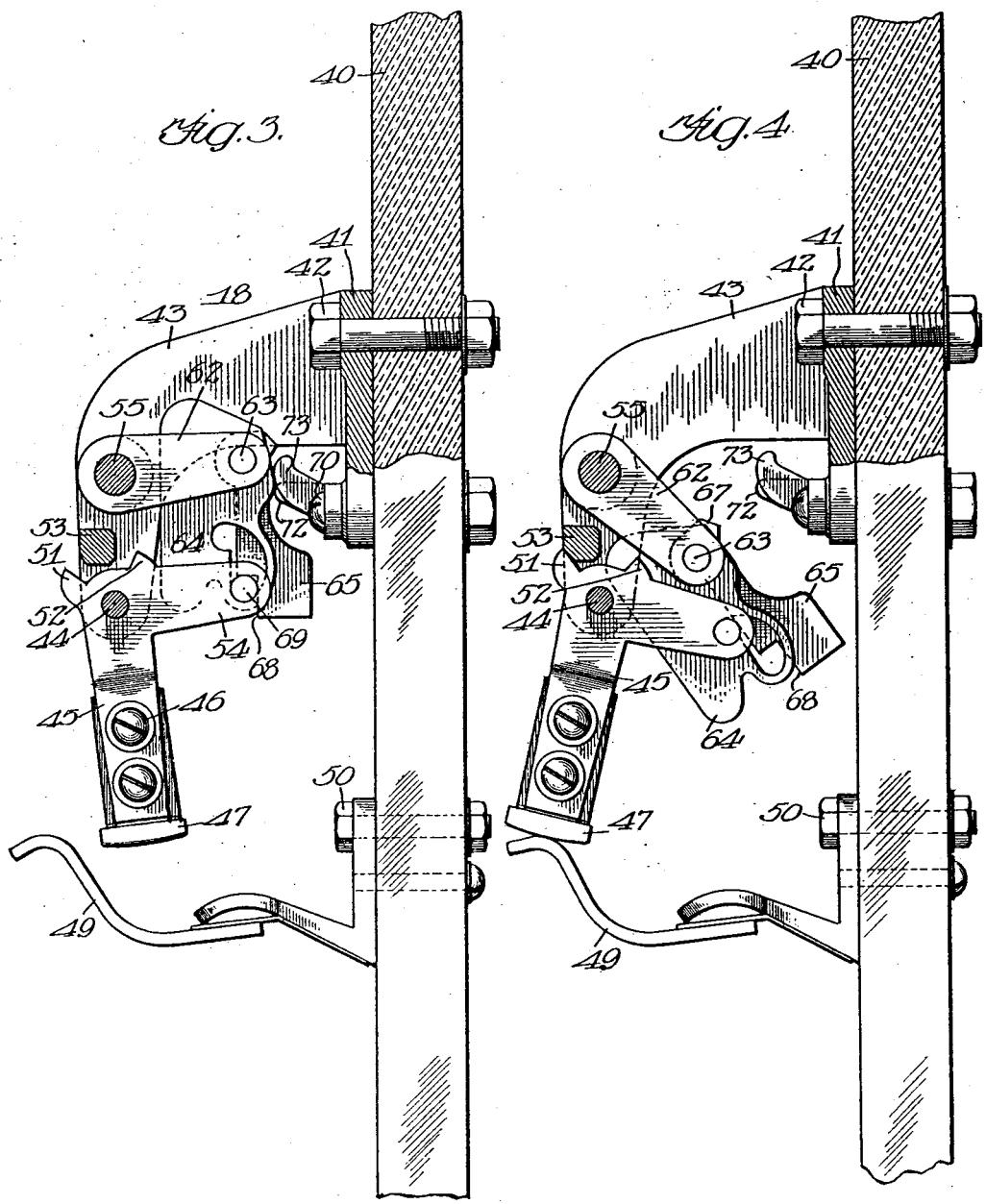

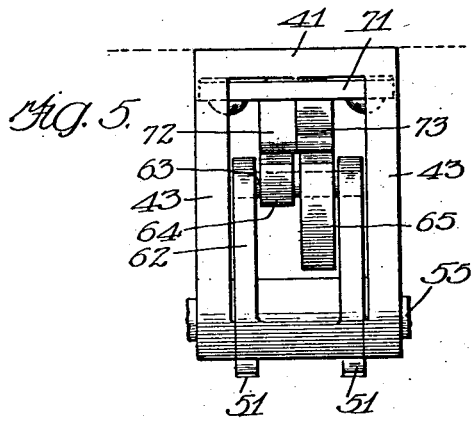
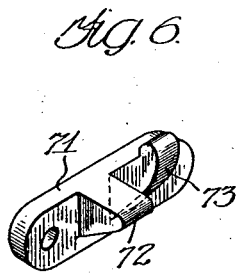
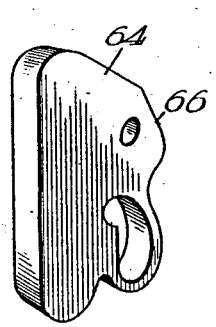
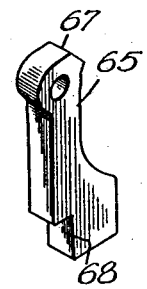
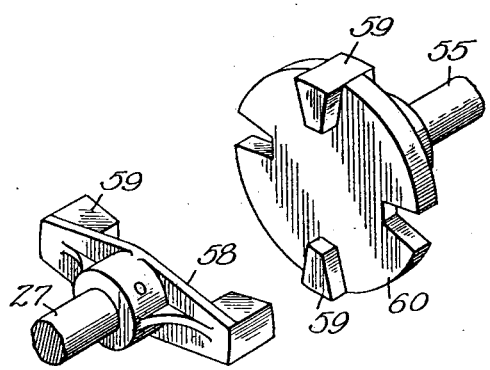

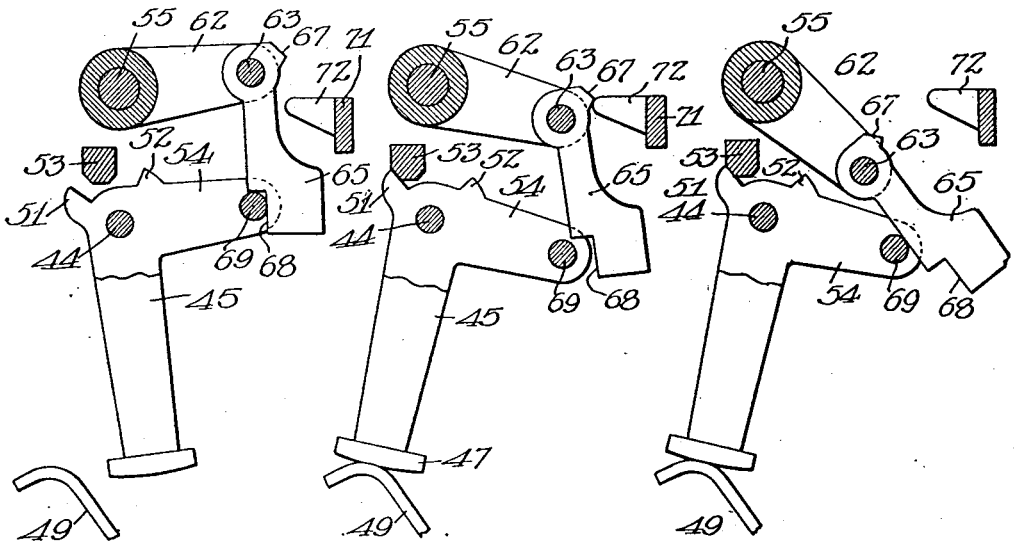

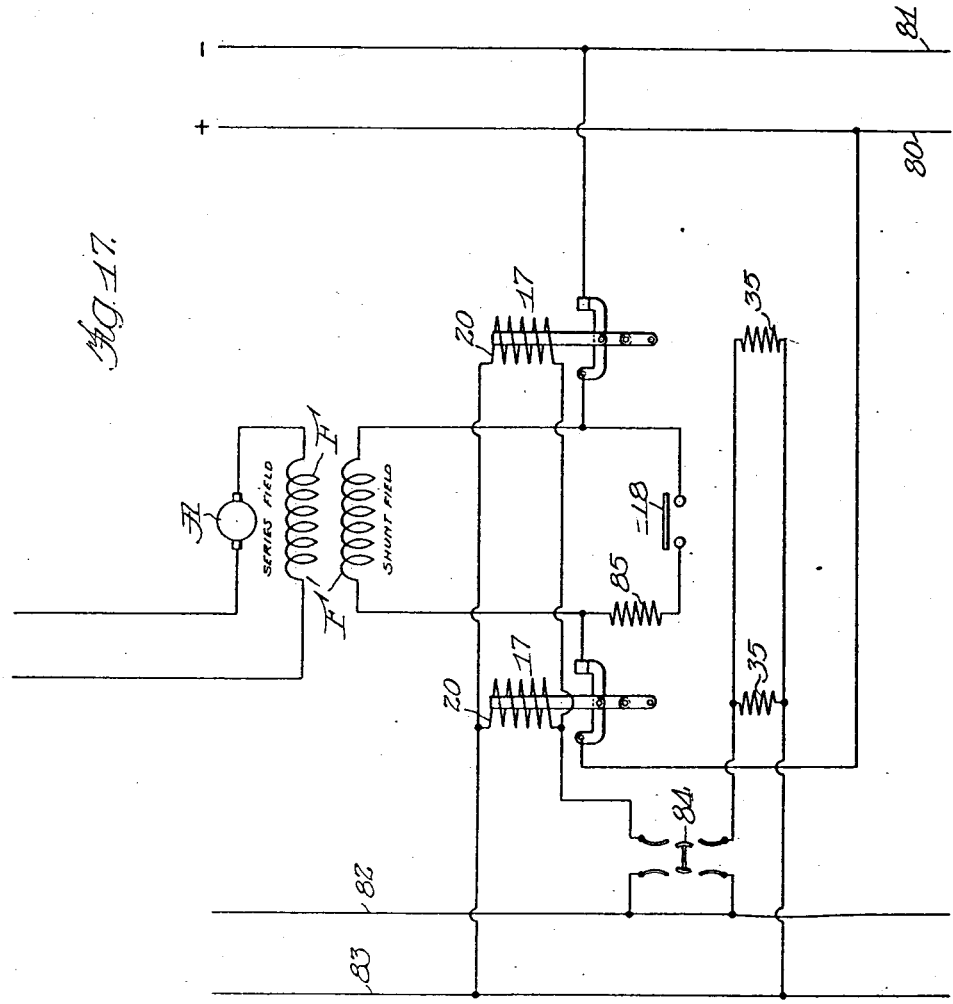

UNITED STATES PATENT OFFICE.

GUSTAVE B. REISBACH, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRIC SWITCH.

1,033,935.      Specification of Letters Patent.      Patented July 30, 1912.

Application filed December 26, 1908. Serial No. 469,419.

*To all whom it may concern:*

Be it known that I, GUSTAVE B. REISBACH, a citizen of the United States, residing at Milwaukee, in the county of Milwaukee and State of Wisconsin, have invented new and useful Improvements in Electric Switches, of which the following is a full, clear, concise, and exact description, reference being had to the accompanying drawing, forming a part of this specification.

My invention relates to improvements in electric switches particularly appropriate for controlling inductive circuits, although it may be employed in other relations.

It is well understood in the art that upon opening the circuit of a shunt or separately excited field winding of a generator, a heavy arc occurs, due to what is known as the "back discharge" of the field coil. Such arcs may be eliminated to a greater or less extent by connecting a resistance across the terminals of the field coil just prior to disconnecting said coil from circuit.

My invention has for its object to provide switches which will operate in the proper sequence to accomplish the result just mentioned.

Other objects of my invention will be hereinafter clearly and fully set forth.

For the purpose of more fully disclosing the characteristic features of my invention, I shall describe the device illustrated in the accompanying drawing, which device embodies my invention in one form. Of course, my invention is susceptible of various modifications.

In the accompanying drawing: Figure 1 is a front elevation of the device; Fig. 2 is a vertical sectional view taken on line 2—2, Fig. 1; Fig. 3 is a vertical sectional view taken on line 3—3, Fig. 1; Fig. 4 is a view similar to Fig. 3, showing the switch in a different position; Figs. 5 to 10, inclusive, are detail views of parts of the device; Figs. 11 to 16, inclusive, are schematic views of the switch shown in Fig. 3, showing the successive positions of parts thereof, and Fig. 17 is a diagrammatic view illustrating one application of my device.

Briefly outlined, the device illustrated comprises a pair of electromagnetically operated main switches 17 and an auxiliary switch 18.

I shall first describe one of the main switches or contactors, both of which are of the same construction.

The contactors are of a conventional type and, in brief, comprise a magnet frame 19 carrying an electromagnet or solenoid 20. The solenoid 20 is provided with a plunger 21 connected by a pin 22 to a switch member 23 pivoted to the magnet frame. The switch member carries a main and an arcing contact, adapted to engage corresponding contacts carried by the magnet frame. This form of contactor is merely used for the purpose of illustration, and it should be understood that any preferred form of contactor may be used in lieu thereof.

The switch 23 is adapted to be locked in closed position by a toggle comprising a pair of links 25, pivoted to said switch, and a bifurcated or U-shaped member 26 rigidly mounted on a pin or spindle 27 revolubly mounted in a suitable frame or support 28. The end of the legs of the U-shaped member 26 are provided with lateral extensions 29 and are connected by a pin 30 to the ends of the links 25. The member 26 is provided with a downwardly extending lug 31, adapted to engage the front of the frame 28 to limit the movement of said member when the members of the toggle have been thrown forwardly slightly out of alinement. In this position the toggle securely locks the switch 23 in closed position. The toggle is automatically set in such position upon the closure of the switch 23 by means of a weighted lever 32, which is fulcrumed on the spindle 27 and movable independently of the member 26 of the toggle. The weighted lever 32 is provided with bifurcations, each having a pair of upwardly extending lugs 33 and 34 disposed on opposite sides of the lateral extensions 29 of the member 26, and adapted to engage therewith to move said member in one direction or the other as the weighted lever is moved. The weight is so disposed on the lever as to normally cause the projections 34 to engage the member 26 of the toggle. Hence, when the switch 23 is raised by its operating magnet, the toggle will be straightened, and when the switch is fully closed the weighted lever 32 will move the members of the toggle slightly forward out of alinement, thereby locking the switch 23 in closed position. For breaking the toggle to release the switch I provide an electromagnet 35, mounted in the frame 28 and having a movable plunger connected by a link 36 to the rear end of the lever 32. Upon energization of the magnet 35 the weighted lever is rocked to impart a hammer blow to the toggle, thereby breaking the same and releasing the switch 23. The switch 23 then drops to open position. The toggle device just described, together with the tripping magnet, form the subject matter of an application filed by me on December 26, 1908, and bearing Serial No. 469,420 and I have, therefore, not described the same in detail in this application.

As illustrated, the contactors 17 are mounted in parallel relation on an insulating panel or base 40, the same being secured thereto in any suitable manner.

The several parts of the auxiliary switch 18 are supported or carried by a bracket 41, secured to the panel 40 by any suitable means, such as bolts 42. The bracket 41 is provided with two forwardly extending parallel side pieces 43. Fulcrumed on the pin 44, which passes through the side pieces 43, is a switch member 45, the upper end of which is bifurcated. The switch is preferably made in two parts, which are insulated from one another and secured together by bolts 46. At its lower end the switch member carries a contact 47 adapted to engage and electrically connect a pair of spring contacts 48 and 49 secured to the insulating panel by bolts 50. Each of the bifurcations at the upper end of the switch member is provided with a pair of upwardly extending lugs 51 and 52, adapted to engage a cross piece 53 of the bracket 41 to limit the movement of the switch member in both directions. Extending rearwardly from the upper end of the switch member are a pair of arms 54. Revolubly mounted in the side pieces of the bracket, above the switch member, is a spindle 55, the ends of which project beyond the bracket. The spindle 55 is arranged in alinement with the spindles 27, upon which the weighted levers of the contactors 17 are mounted, and the ends thereof are connected to the ends of the spindles 27 by insulating couplings. Each coupling, as shown in Fig. 9, comprises a pair of members 58, one rigidly secured to the end of the spindle 55 and the other secured to the end of one of the spindles 27. Each of the members 58 is provided at opposite ends with lugs 59 adapted to fit into correspondingly shaped recesses in an insulating disk 60, preferably of fiber. With this arrangement it will be seen that the main switches are effectually insulated from each other. Keyed, or otherwise rigidly secured on the spindle 55, is a U-shaped member 62. The member 62 carries a pin 63 upon which are fulcrumed two depending pawls 64 and 65. These pawls are best illustrated in Figs. 7 and 8. The pawl 64 is preferably of the construction shown, having a curved slot formed therein with a notch at the end of said slot and being weighted for the purpose hereinafter set forth. The pawl 64 is also provided with an inclined surface 66. The pawl 65 is provided at its upper end with an inclined surface 67, and at its lower end with a notched portion 68. The pawls 64 and 65 extend downwardly between the rearwardly extending arms 54 of the switch member, and said arms carry a pin 69 which passes through the slot in the pawl 64 and arranged to be engaged by the notched portion 68 of the pawl 65.

Secured to the back plate of the bracket by screws 70 is a plate 71, having lugs 72 and 73 thereon adapted to be engaged by and to control the action of the pawls 65 and 64 respectively.

Before explaining the operation of the device as a whole, I will first explain the operation of the auxiliary switch. A clear understanding of the operation of this switch can be obtained from the schematic views 11 and 16, which I will now explain. Figs. 11, 12 and 13, show the progressive steps incident to the closure of the switch, while Figs. 14, 15 and 16, show the progressive steps incident to the opening of the switch. The auxiliary switch is adapted to be closed through the medium of the pawl 65 and to be opened through the medium of the pawl 64, and, therefore, for the purpose of simplifying the views, I have omitted the pawl 64 in the first set of views mentioned and the pawl 65 in the second set. Referring now to Fig. 11, the switch 45 is shown in full open position with the notched portion of the pawl 65 engaging the pin 69 carried by the rearwardly extending arms 62 of the switch. To close the switch, the spindle 55 is rotated clockwise, thereby throwing the member 62 which carries the pawl 65 downwardly. Inasmuch as the pawl 65 engages a part of the switch, it will be seen that as said pawl is forced downwardly the switch will be thrown forwardly into closed position. As soon as the switch reaches closed position, as illustrated in Fig. 12, the lug 67 on the pawl 65 engages the stationary lug 72, thereby throwing the pawl out of engagement with the switch. Continued rotation of the spindle will throw the member 62 and the pawl 65 into the position illustrated in Fig. 13 without imparting any further movement to the switch. Fig. 16 shows the position of the pawl 64 when the switch 45 is open and the pawl 65 is in the position illustrated in Fig. 11. In this position the pawl 64 is held in a substantially vertical position by the stationary lug 73. As the spindle 55 is rotated to close the switch, the pawl 64 travels downwardly until the same is moved out of engagement with the lug 73, whereupon it will move into an oblique position due to the fact that it is weighted at its upper and outer end. During the movement of the spindle to bring the pawl 65 into the position illustrated in Fig. 13, the pawl 64 moves simultaneously into the position illustrated in Fig. 14. It will thus be apparent that the continued movement of the spindle 55, after closure of the switch, permits the pawl 64 to reach the position illustrated in Fig. 14, in which position the pin 69 carried by the rearwardly extending arms of the switch rests in the notched portion of the pawl 64. It will thus be seen that if the spindle 55 be now rotated in a reverse direction, the pawl 64 will be raised, thereby raising the arm of the switch, which moves the switch to open position, as illustrated in Fig. 15. As the switch reaches the position illustrated in Fig. 15, the stationary lug 73 engages the inclined face 66 of the pawl 64, thereby throwing the lower end of the pawl forwardly and disengaging the pawl from the pin 69 of the switch. Continued rotation of the spindle 55 will move the pawl 64 to the position illustrated in Fig. 16. As the switch is opened the pawl 65 will gradually move back to the position illustrated in Fig. 11. Thus, when the spindle 55 is again rotated in a clockwise direction, the switch will be closed in the manner previously described.

I shall now describe the combined operation of the contactors 17 and the auxiliary switch 18, and show that the auxiliary switch will open just in advance of the closure of the main switches, and close just in advance of the opening of the main switches. Bearing in mind that the lower member 26 of each toggle of the contactors 17 is rigidly mounted on a spindle 27, it will be apparent that as the contactors are closed the toggles will be straightened, thereby moving the members 26 forwardly and imparting an anti-clockwise movement to the spindles 27. Inasmuch as these spindles are coupled to the spindle 55 of the auxiliary switch, said spindle 55 will also be moved in an anti-clockwise direction. Assuming now that the main contactors are open and the auxiliary switch closed, as soon as the operating windings of said contactors are energized the switch members of said contactors will be drawn upwardly, thereby straightening the toggles. This, as already stated, imparts an anti-clockwise movement to the operating spindle 55 of the auxiliary switch. Rotation of the spindle 55 in this direction causes the auxiliary switch to open, as already described. Reference to Figs. 14 and 15 will show that the auxiliary switch is opened some time before the spindle 55 is rotated to its full extent. On the other hand, the main contactors are not closed until the spindle 55, which moves in unison with the members 26 of the toggles, nearly reaches the limit of its rotation. It will thus be seen that the auxiliary switch is opened before the main switches are closed. As soon as the main switches are fully closed the weighted levers will set the toggles to maintain said switches in closed position, after which their operating windings may be deënergized.

Assuming now that the tripping magnets of the main contactors be energized, the weighted levers will be rocked in a direction to break the toggles. The weighted levers do not engage the toggles immediately upon being rocked in this direction, but acquire considerable momentum before so doing, and in consequence thereof impart a hammer blow to the toggles which quickly and easily breaks the same. Immediately upon the breaking of the toggles, the members 26 thereof are moved in an opposite direction to that previously described, and consequently rotate the spindles 27 and 55 in a clockwise direction. Movement of the spindle 55 in this direction causes the auxiliary switch to close. Reference to Figs. 11 and 12 will show that a very slight rotation of the spindle 55 is sufficient to close the auxiliary switch. On the other hand, the main switches do not open until the toggle members have moved some distance, which enables the auxiliary switch to close in advance of the opening of the main switches.

I shall now describe Fig. 17, which is a diagrammatic view showing the device heretofore described, used to control the circuit of a separately excited field coil of a generator. The generator illustrated, is provided with an armature A, a series field winding F and a separately excited field winding F'. The field winding F' is supplied with current from the supply lines 80 and 81. The contactors 17 are shown schematically, the contact members thereof being adapted to open and close the circuit of the field winding F' on opposite sides thereof. The operating windings of said contactors are shown connected in parallel, and to supply lines 82 and 83. The tripping coils are also connected in parallel and to the supply lines 82 and 83. A switch 84 is provided for controlling the circuits of the windings of said contactors. The auxiliary switch 18 is used for controlling a loop across the terminals of the field winding F', and in this loop is connected a field discharge resistance 85. As illustrated, the contactors are closed and the auxiliary switch is opened. When desired to open the circuit of the winding F', it is only necessary to move the switch 84 to close the circuits of the tripping magnets. This results in first closing the auxiliary switch 18 and then opening the contactors 17. Immediately upon the closure of the switch 18 the resistance 85 is connected in a closed loop directly across the terminals of the winding F', thus providing a high resistance path for induced current resulting from the opening of the contactors 17. Hence, when the contactors are opened, little or no arcing will take place at their terminals. Upon the energization of the operating windings of the contactors, the auxiliary switch will first be opened and then the main switches closed.

While I have shown two main contactors, it should be understood that only one of the same is necessary, and that the auxiliary switch will operate in the same manner if only one contactor is used.

Of course, the device illustrated is capable of various modifications, all of which fall within the purview of my invention.

Having thus described my invention, what I claim as new and desire to secure by Letters Patent, is:

1. In combination, two switches and means for operatively connecting said switches together in both of their extreme positions and releasing the same after a predetermined joint movement.

2. In combination, two switches and means for operatively connecting said switches together when in their extreme positions and releasing the same after a predetermined joint movement, one of said switches being arranged to both make and break circuit prior to circuit variations by the other.

3. In combination, two switches and means for operatively connecting said switches together when in their extreme positions and releasing the same after a predetermined joint movement, said switches being adapted to open and close in reverse order and one of the same being adapted to both open and close prior to the corresponding operation of the other.

4. In combination, a switch, operating means therefor, self adjusting connections for locking said switch to said operating means when the latter is in predetermined positions and releasing the same upon a predetermined movement of said operating means and a second switch adapted to be opened and closed by said operating means after said first mentioned switch has been released therefrom.

5. In combination, a switch, an operating member therefor movable in opposite directions between predetermined limits, and self adjusting connections for locking said switch to said operating member when the latter reaches either limit of its movement and for automatically releasing said operating member from said switch when said switch is either opened or closed.

6. In combination, a switch, an operating member therefor movable in opposite directions between predetermined limits, self adjusting connections for locking said switch to said operating member when the latter reaches either limit of its movement and for automatically releasing said operating member from said switch when said switch reaches either open or closed position, and a second switch movable with said operating member and arranged to open and close as said member reaches the limits of its movement.

7. In combination, a switch, an operating member therefor movable in opposite directions between predetermined limits, self adjusting connections for locking said switch to said operating member when the latter reaches either limit of its movement and for automatically releasing said operating member from said switch when said switch reaches either open or closed position, and a second switch movable with said operating member and arranged to open and close as said member reaches the limits of its movement, said second mentioned switch being arranged to open and close in reverse order to said first mentioned switch.

8. In combination, a switch, a member movable therewith, said member being adapted to move in one direction when said switch is open, and in an opposite direction when said switch is closed, an auxiliary switch and self adjusting connections for causing said auxiliary switch to move with said member during the initial part of its movement in either direction and for automatically releasing said auxiliary switch from said member when the former reaches either open or closed position whereby said auxiliary switch is always operated in advance of said first mentioned switch.

9. In combination, a switch, a member movable therewith, said member being movable in one direction when said switch is opened, and in an opposite direction when said switch is closed, an auxiliary switch, a plurality of pawls carried by said member, one of said pawls being adapted to engage said auxiliary switch when said member is at one limit of its movement, and the other of said pawls being adapted to engage said auxiliary switch when said member is at the other limit of its movement whereby said auxiliary switch will be moved immediately upon each reversal of said member, said pawls being arranged to disengage said auxiliary switch to permit continued movement of said member independently thereof when said auxiliary switch reaches either open or closed position, thereby insuring operation of said auxiliary switch in advance of said first mentioned switch whenever the latter is opened or closed.

10. In combination, a switch, a member movable therewith, said member being movable in one direction when said switch is opened, and in an opposite direction when said switch is closed, an auxiliary switch, a plurality of pawls carried by said member, one of said pawls being adapted to engage said auxiliary switch when said member is at either limit of its movement whereby said auxiliary switch will be moved immediately upon each reversal of said member, said pawls being arranged to disengage said auxiliary switch to permit continued movement of said member independently thereof when said auxiliary switch reaches either open or closed position, thereby insuring operation of said auxiliary switch in advance of said first mentioned switch whenever the latter is opened or closed, said auxiliary switch being arranged to open and close in reverse order to said first mentioned switch.

11. In combination, two switches, common electro-responsive means for operating said switches and self adjusting mechanical means for operatively connecting and releasing said switches to insure both opening and closure of one of the same prior to corresponding operations of the other.

12. In combination, an electromagnetically operated main switch, an auxiliary switch, an operating member for said auxiliary switch arranged to be moved in opposite directions by said main switch to open and close said auxiliary switch in reverse order to said main switch, and connections between said operating member and said auxiliary switch for insuring the opening and closing thereof prior to said main switch.

13. In combination, a main switch, means tending to lock said switch in closed position, an auxiliary switch actuated by said main switch, said auxiliary switch being arranged to open and close in reverse order to said main switch and in advance thereof, and an electromagnet for actuating said locking means to release said switch.

14. In combination, an electromagnetically operated main switch, means tending to automatically lock said switch in closed position, an auxiliary switch, an operating member therefor arranged to be moved in opposite directions by said main switch to open and close said auxiliary switch in reverse order to said main switch and in advance thereof, and an electromagnet for actuating said locking means to release said switch.

15. In combination, an electromagnetically operated main switch, a toggle for locking said switch in closed position, one member of the toggle being connected to said switch and another member being rigidly mounted on a revoluble spindle, said switch being adapted to rotate said spindle through the medium of said toggle, an auxiliary switch having an operating member connected to said spindle and adapted to be operated thereby in opposite directions as the main switch is opened and closed, connections between said auxiliary switch and its operating member for causing the same to open and close in reverse order to said main switch and in advance thereof, a weighted lever tending to set said toggle to lock said main switch in closed position, and an electromagnet for operating said weighted lever to break said toggle to release said switch.

16. In combination, an electroresponsive main switch, an auxiliary switch and mechanical means for rigidly connecting and releasing said switches to insure substantially full operation of said auxiliary switch in advance of the opening and closing of said main switch, said main switch being adapted to remain in closed position after deënergization of its operating winding and an electroresponsive tripping device for releasing said main switch.

17. In combination, a pivoted switch, a revoluble spindle, toggle links connecting said switch with said spindle to revolve the latter when said switch is operated and to lock said switch in closed position, an arm carried by said spindle, two pivoted pawls carried by said arm, an auxiliary switch adapted to be alternately engaged by said pawls when said arm reaches the limits of its movement to cause said auxiliary switch to be operated immediately upon each reversal of said spindle, and lugs adapted to engage said pawls to release the same from said auxiliary switch when said auxiliary switch is moved into either open or closed position whereby said auxiliary switch will always operate in advance of said first mentioned switch.

In witness whereof, I have hereunto subscribed my name in the presence of two witnesses.

GUSTAVE B. REISBACH.

Witnesses:
FRANK H. HUBBARD,
SHEPLER W. FITZGERALD.